E. H. SHATTUCK.
INTERNAL COMBUSTION ENGINE.
APPLICATION FILED OCT. 18, 1912.
1,108,010.
Patented Aug. 18, 1914.
2 SHEETS—SHEET 2.
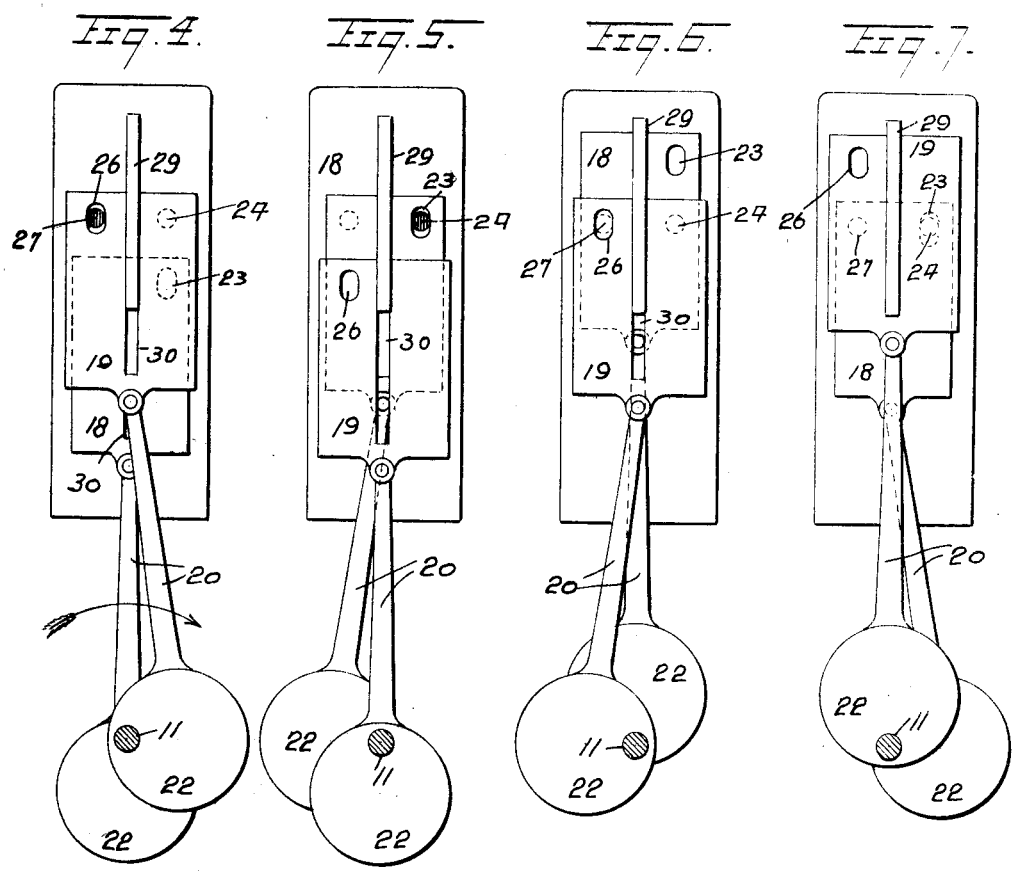
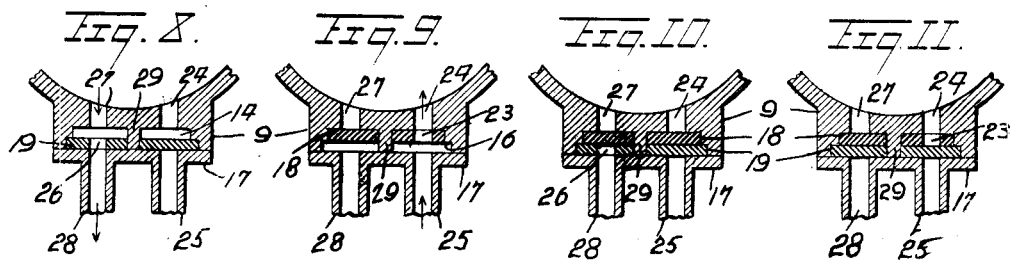
WITNESSES
H. J. Walker
Wm. F. Hickel
INVENTOR
EDWIN H. SHATTUCK.
BY Munn & Co
ATTORNEYS

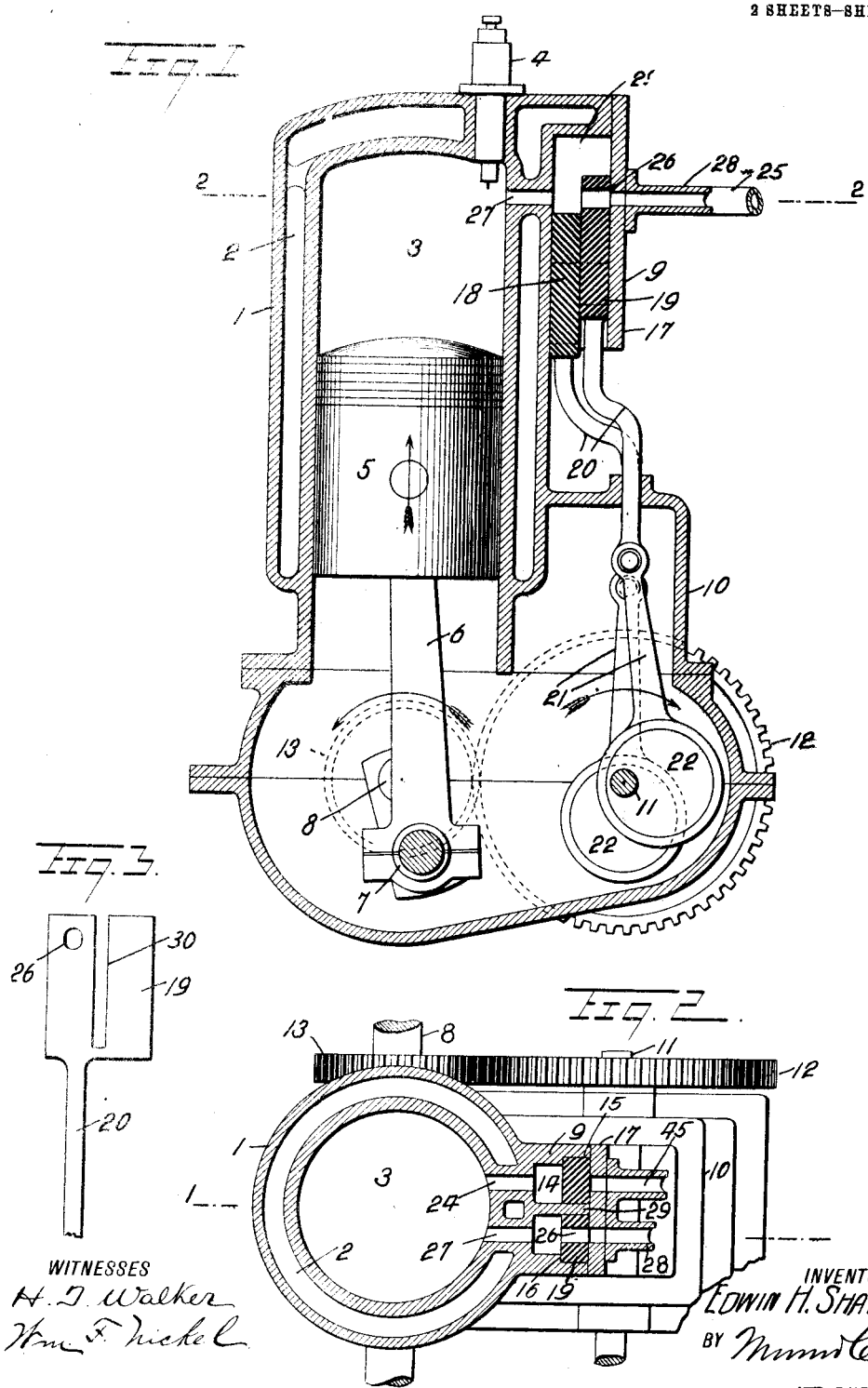

UNITED STATES PATENT OFFICE.

EDWIN H. SHATTUCK, OF GRANBY, CONNECTICUT.

INTERNAL-COMBUSTION ENGINE.

1,108,010.  Specification of Letters Patent.  Patented Aug. 18, 1914.

Application filed October 18, 1912. Serial No. 726,421.

*To all whom it may concern:*

Be it known that I, EDWIN H. SHATTUCK, a citizen of the United States, and a resident of Granby, in the county of Hartford and State of Connecticut, have invented a new and Improved Internal-Combustion Engine, of which the following is a full, clear, and exact description.

My invention relates to an improvement in internal combustion engines, and particularly the valve gearing on such engines, by which the inflow and outflow of the gases of such engines are controlled; and the primary object thereof is to produce an engine of this type which will be perfectly noiseless in operation and be characterized by a smaller number of parts than prior motors of this type.

Reference is to be had to the accompanying drawings forming a part of this specification, in which the same characters of reference indicate the same parts in all the views.

Figure 1 is a longitudinal section taken through a cylinder, showing the manner in which the valve gear is operated; Fig. 2 is a horizontal section on the line 2—2 of Fig. 1; Fig. 3 is a perspective view of one of the valves of the engine, the same being of the sliding type; Figs. 4, 5, 6 and 7 are diagrammatic views illustrating the positions assumed by the valves at each step in the cycle of operation of the engine; and Figs. 8, 9, 10 and 11 are sectional views taken on the plane indicated by the line 2—2 of Fig. 1, and showing the valves in accordance with the positions they occupy on Figs. 4, 5, 6 and 7, respectively.

My engine comprises one or more cylinders each provided with a water jacket 2 and inclosing an explosion chamber 3. The usual igniter shown at 4 is provided, and the piston 5 is joined by a connecting rod 6 to the crank 7 of the crank-shaft 8. On the side of the engine near the head thereof is formed a valve casing 9, and at the opposite end is a gear casing 10, through the sides of which passes a shaft 11 carrying a gear 12 meshing with a gear 13 on the shaft 8, the latter gear being half the diameter of the former. These gears may be carried outside of the casing, or inside if preferred, and they serve to impart the required movements to the valves in the casing 9.

The valve casing 9 is preferably made in the form of a projection cast integral with the cylinder 1, and containing recesses 14 and 15, the former being narrower than the latter, so as to form shoulders 16; and a cover 17 is provided which is secured in place by any convenient means, such as bolts or the like, to inclose these recesses, except at the bottom. In the recesses moves a valve 18, which controls the intake of gas, and another valve 19 which controls the exhaust, and these valves 18 and 19 are made in the form of flat plates of the required thickness, and are arranged to slide upon one another, the former being located in the recess 14 and the latter in the recess 15. Each valve is connected by a rod 20 to an eccentric rod 21 operated by eccentrics 22 carried by the shaft 11, these eccentrics being 90° apart from each other.

The intake valve 18 is provided with an opening 23 which controls the intake passage 24 leading through the side of the cylinder in line with the intake pipe 25. This opening is arranged in one of the upper corners of the valve, this corner being shown on the right on Figs. 4 to 7. Likewise, the valve 19 is provided with an opening 26 arranged to establish communication between the exhaust opening 27 leading through the wall of the cylinder beside the opening 24, and in line with the exhaust pipe 28. The opening 26 is also arranged in the upper part of the exhaust valve, but near the corner opposite the opening 24 in the other valve. These valves are driven by the eccentrics so as to provide for the intake and outflow of gases at the proper time in the operation of the engine.

In order to keep the intake and outflow passages of the engine distinct and separate I provide a central rib 29 extending down from the inner ends of the recesses 14 and 15 between the passages 24 and 27, and this rib is received in slots 30 extending centrally inward from the outer or free edges of the valves 18 and 19. The function of this rib is to prevent any air from being drawn in through the inlet passage 24 by way of the exhaust pipe 28 when the engine is making the intake stroke, the valve 19 being in such position at this time that its upper edge will be below the passages 27 and the pipe 28, and the valve 18 then serving to close the passage 27.

In the operation of my engine, which may be of one or more cylinders, as will be readily understood, the valves and eccentrics will occupy the position shown in Fig. 4 when the exhaust is taking place, the openings 26 and 27 and the exhaust pipe 28 then being in registry. The intake valve 18 will now be lowered so that its upper edge is below the passage 24, but the outlet valve will close the pipe 25 and the exhaust takes place only through the passage 27, owing to the rib 29 above mentioned. At the end of the exhaust stroke the valves will occupy the position shown in Fig. 5, and suction commences. The port 23 now establishes communication between the passages 24 and the pipe 25, and the valve 18 closes the passage 27. The rib 29 prevents air from being drawn from the exhaust pipe through the upper part of the recess 15 and intake passage 24.

During the compression stroke the parts will occupy the position shown in Fig. 6. The valve 19 will have its opening 26 in alinement with the passage 27, but the valve 18, now at its highest position, closes both the openings 26 and 24. During the next stroke, when ignition takes place, the valves will occupy the position shown in Fig. 7. The valve 18 now has its opening 23 in alinement with the passage 24, but this valve closes the passage 27 and the other valve 19 closes both the pipes 25 and 28.

The shaft which carries the eccentric runs in ball bearings, and the eccentrics themselves may also be ball bearings. The valves 18 and 19 are properly lubricated and the space inside the valve casing 9 may be entirely inclosed, so that these valves can run in oil. All the bearings and the crank and gear casings will be oiled by lubricant in the bottom of the crank casing, which will be splashed up by the crank in the course of its rotation.

It will be seen that by laying the valves 18 and 19 upon each other and arranging the passages therethrough in the manner shown and described, the exhaust valve acts as an extension of the intake valve to close the inlet pipe 25 when the valve 18 is withdrawn during the exhaust stroke. Similarly the valve 18 acts as an extension of the exhaust valve 19 when the exhaust valve is withdrawn during an intake stroke, and serves in its turn to close the pipe 27, and when the compression and explosion takes place, each valve coöperates with the other valve, which may have its opening in position to register with one of the passages 24 and 27, to prevent communication, and thus close off the power chamber 4 from all communication with the inlet and exhaust pipes.

I wish to have it understood that the above description is illustrative only, disclosing but one embodiment of my invention, and I do not care to be limited to the exact details shown and described, but reserve to myself the right to make any changes in the shape, size and arrangement of the parts as fairly fall within the scope and spirit of my invention.

Having thus described my invention, I claim as new and desire to secure by Letters Patent:

1. In an internal combustion engine, a sliding valve in the form of a plate having an opening therethrough near one side of the same, the said valve being provided with a central longitudinal slot opening at one edge of the valve.

2. In an internal combustion engine, a sliding valve consisting of a flat plate having parallel lateral edges, said valve having an opening therethrough near one of the said edges, and a slot extending centrally inward from its outer edge.

3. In an internal combustion engine, the combination of a cylinder having passages leading into the same arranged side by side, a valve casing covering the outer ends of said passages, intake and exhaust pipes leading from said casing, a pair of superposed valves in the form of plates having parallel edges contained in said casing, said valves having openings near opposite lateral edges, and means for reciprocating said valves to establish communication between the inside of the cylinder and supply and exhaust pipes in proper order.

4. In an internal combustion engine, the combination of a cylinder having a pair of passages leading therefrom arranged side by side, a valve casing covering the outer ends of said passages, supply and exhaust pipes communicating with said casing, a pair of valves in the form of flat plates having parallel edges in said casing, each of said valves having openings therethrough near its inner end and adjacent opposite lateral edges, and means for reciprocating said valves to open said passages to the inlet and exhaust pipes in proper order.

5. In an internal combustion engine, the combination of a cylinder having a pair of passages leading through its wall arranged side by side, a valve casing covering the outer ends of said passages, intake and exhaust pipes leading to said casing, a pair of superposed valves in the form of flat plates in said casing, said valves having parallel edges and having openings therethrough adjacent their inner ends and near opposite lateral edges thereof, and means for reciprocating said valves, said valves being designed to overlap each other at the inner end of the engine stroke, and each serving as an extension of the other valve to prevent the passage leading from the cylinder into the valve casing controlled by the other valve from being opened, except at the right instant.

6. In an internal combustion engine, the combination of a cylinder having a pair of passages leading therefrom, a valve casing covering the outer ends of said passages, supply and exhaust pipes leading to said casing, a pair of valves in the form of superposed plates arranged in said casing and having parallel lateral edges, each of said valves having an opening therethrough near its inner end adjacent opposite lateral edges, and means for reciprocating said valves so as to cause each of said valves to act as part of the other valve to prevent the passage controlled by the other valve from being opened to the associated pipe except at the right instant.

7. In an internal combustion engine, the combination of a cylinder having a pair of passages arranged in its wall and located side by side, a valve casing covering the outer ends of said passages, intake and exhaust pipes leading to said casing, a pair of valves in the form of superposed plates in said casing, said valves having openings therethrough arranged at opposite sides to control said passages, a rib in said casing extending in the direction of movement of said valves, and a slot in each of said valves receiving said rib, said rib serving to separate the exhaust passage and pipe from the intake passage and the supply pipe.

8. In an internal combustion engine, the combination of a cylinder having an intake passage and an exhaust passage arranged side by side in its wall, a valve casing on the side of the cylinder and communicating with the same through said intake and exhaust passages, supply and exhaust pipes communicating with the valve casing in line with the said intake and exhaust passages of the cylinder, and valves moving in said valve casing and having openings to establish communication between the cylinder and its supply and exhaust pipes in proper order.

In testimony whereof I have signed my name to this specification in the presence of two subscribing witnesses.

EDWIN H. SHATTUCK.

Witnesses:
STANLEY W. EDWARDS,
M. A. SMITH.